US007228156B2

(12) United States Patent
Gilbert

(10) Patent No.: US 7,228,156 B2
(45) **Date of Patent: *Jun. 5, 2007**

(54) RF-ACTUATED MEMS SWITCHING ELEMENT

(75) Inventor: Roland A Gilbert, Milford, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 239 days.

This patent is subject to a terminal disclaimer.

(21) Appl. No.: 11/008,503

(22) Filed: Dec. 9, 2004

(65) Prior Publication Data

US 2005/0107125 A1 May 19, 2005

Related U.S. Application Data

(63) Continuation-in-part of application No. 09/847,554, filed on May 2, 2001, now Pat. No. 6,865,402.

(60) Provisional application No. 60/201,215, filed on May 2, 2000.

(51) Int. Cl.
*H04M 1/00* (2006.01)

(52) U.S. Cl. .................. 455/562.1; 455/561; 455/90.3; 333/105; 343/823

(58) Field of Classification Search .................. 455/73, 455/77, 82, 83, 84, 87, 554.2, 561, 562.1, 455/575.5, 90.3, 7, 13.3, 428, 431, 445; 250/336.1; 343/700, 723, 823; 333/262, 333/105

See application file for complete search history.

(56) References Cited

U.S. PATENT DOCUMENTS 3,849,745 A 11/1974 Schellenberg et al.
3,940,770 A 2/1976 Fassett et al.
4,010,474 A 3/1977 Provencher
4,864,314 A 9/1989 Bond
5,144,319 A 9/1992 Roberts
5,289,496 A 2/1994 Nakagawa et al.
5,457,465 A 10/1995 Collier et al.
5,485,167 A 1/1996 Wong et al.
5,541,614 A * 7/1996 Lam et al. ............... 343/792.5
5,561,434 A 10/1996 Yamazaki
5,578,976 A 11/1996 Yao
5,790,080 A 8/1998 Apostolos
5,943,011 A 8/1999 Acoraci et al.
5,949,303 A 9/1999 Arvidsson et al.
6,008,762 A 12/1999 Nghiem
6,069,540 A 5/2000 Berenz et al.
6,069,587 A 5/2000 Lynch et al.
6,078,288 A 6/2000 Adams et al.
6,100,694 A 8/2000 Wong (Continued)

*Primary Examiner*—George Eng
*Assistant Examiner*—Marcos L Torres
(74) *Attorney, Agent, or Firm*—Maine & Asmus

(57) ABSTRACT

An RF-actuated microelectromechanical systems (MEMS) switch for use with switchable RF structures such as antennas and reflectors is disclosed. An antenna within each MEMS switch module is coupled to a circuit that provides a trigger voltage based on an RF control signal received at the antenna. The trigger voltage output of the circuit is used as the control the MEMS switch. This allows arrays of MEMS switch modules to be actuated by remotely generated radio frequency signals thus alleviating the need for running metallic conductors or optical fibers to each MEMS switch. Frequency response characteristics, phasing, reflectivity, and directionality characteristics may be altered in real-time.

19 Claims, 9 Drawing Sheets

U.S. PATENT DOCUMENTS

| | | | | |
|---|---|---|---|---|
| 6,127,908 | A | 10/2000 | Bozler et al. | |
| 6,154,176 | A | 11/2000 | Fathy et al. | |
| 6,198,438 | B1 | 3/2001 | Herd et al. | |
| 6,204,819 | B1 * | 3/2001 | Hayes et al. | 343/702 |
| 6,242,989 | B1 * | 6/2001 | Barber et al. | 331/177 V |
| 6,307,452 | B1 | 10/2001 | Sun | |
| 6,384,353 | B1 * | 5/2002 | Huang et al. | 200/181 |
| 6,384,797 | B1 | 5/2002 | Schaffner et al. | |
| 6,452,465 | B1 | 9/2002 | Brown et al. | |
| 6,509,875 | B1 | 1/2003 | Nair et al. | |
| 6,538,621 | B1 * | 3/2003 | Sievenpiper et al. | 343/909 |
| 6,587,021 | B1 | 7/2003 | Streeter | |
| 6,618,189 | B2 | 9/2003 | Tangonan | |
| 6,646,525 | B2 * | 11/2003 | Bozler et al. | 333/246 |
| 2001/0040530 | A1 | 11/2001 | Livingston et al. | |
| 2001/0040675 | A1 * | 11/2001 | True et al. | 355/77 |
| 2002/0072163 | A1 | 6/2002 | Wong et al. | |
| 2002/0151281 | A1 * | 10/2002 | Izadpanah et al. | 455/83 |
| 2003/0122079 | A1 | 7/2003 | Pobanz et al. | |
| 2005/0285696 | A1 * | 12/2005 | Glass et al. | 333/101 |

* cited by examiner

RF-ACTUATED MEMS SWITCHING ELEMENT

RELATED APPLICATIONS

This application is a continuation-in-part of U.S. application Ser. No. 09/847,554, filed May 2, 2001 now U.S. Pat. No. 6,865,402, which claims the benefit of U.S. Provisional Application No. 60/201,215, filed May 2, 2000. Each of these applications is herein incorporated in its entirety by reference.

FIELD OF THE INVENTION

The invention relates to micro-electro-mechanical systems (MEMS), and more particularly, to RF-actuated MEMS switches suitable for use in frequency-agile, steerable, self-adaptable, programmable and conformal antenna systems and other systems where configuration of elements such reflectors is desirable.

BACKGROUND OF THE INVENTION

Deployment of wireless communication systems are increasing. Given crowded frequency bands and diverse requirements for multi-frequency communication, antenna structures able to perform in one or more bands or with switchable directionability characteristics are of great interest. One solution here is the use of reconfigurable antennas or other structures (e.g., reflective structures). Generally speaking, these are antennas or associated resonant structures which may have their frequency and/or their directional characteristics altered so as to perform in one or more frequency bands and/or with one or more directional beams.

Reconfigurable antenna structures have been used for some time, where elements of the structure are connected and disconnected by a switch. PIN diodes and GaAs field effect transistors (FETs) have been used to perform these switching operations. Such switching devices typically require a bias current and corresponding circuitry, making their use cumbersome. The advent of micro-electro-mechanical systems (MEMS) has allowed the creation of ultra-small switches. The introduction of MEMS switches has created new possibilities in the RF communications field.

For example, multiple ground planes behind a single radiating element may be switched in or out of the circuit using an array of MEMS switches. The MEMS switches can be constructed as bi-stable devices and are switched from one position to the other by the application of a DC voltage to an input terminal. Any DC voltage source may be used to activate the MEMS switches. Conventionally, the DC activation voltage is delivered to the switch by conductive material, such as copper wire or a copper run on a printed wiring board.

In high frequency (e.g., microwave, millimeter wave) applications, however, the introduction of copper or other conductive materials into or near an RF structure may have an undesirable effect. For instance, added wires and conductors may scatter the RF fields around antenna elements, which distorts the antenna radiation patterns or affects the antenna impedance. In some applications, the switch control wires can be concealed by the antenna elements or their RF feeds, thereby minimizing the interference with the operation of the antenna. However, only a few antenna elements allow embedding of the control lines. To address this problem, strategies have been developed to use a photovoltaic cell to generate the DC switching voltage for the MEMS switch, as shown in the system 100 of FIG. 1.

Here, MEMS switch 102 is attached to a photovoltaic cell 104. An optional capacitor 106 may be utilized at the switch input. A laser beam 108 illuminates photovoltaic cell 104, causing the MEMS switch 102 to change states. A passive antenna element or other structure connected thereto is then switched in or out of the circuit. Laser light 108 is generally conducted to photovoltaic cell 104 by an optical fiber. Unfortunately, the running of optical fiber from a laser light source to the MEMS switch 102 is not practical for many applications. Moreover, if the switch 102 must be enclosed in an opaque material, then neither visible nor infrared (IR) light can be used to activate them effectively.

What is needed, therefore, is a MEMS switch that can be activated without adversely affecting antenna structure performance. In a more general sense, there is a need for a MEMS switch that can be activated transparently to the application it is supporting.

SUMMARY OF THE INVENTION

One embodiment of the present invention provides an RF-actuated microelectromechanical systems (MEMS) switch module. The module includes an antenna for receiving an externally-generated RF control signal, and providing an antenna output signal representative thereof. A circuit is operatively connected to the antenna, and is configured for receiving the antenna output signal and generating a trigger voltage. A MEMS switch is configured to actuate in response to the trigger voltage. The circuit may include, for example, a tuned circuit and a detector. Here, the tuned circuit is operatively connected to the antenna and is configured to resonate at the frequency of the RF control signal, thereby providing a continuous wave signal. A detector (e.g., rectifier and capacitor circuit) is operatively connected to the tuned circuit and is configured to generate the trigger voltage based on the continuous wave signal. The RF control signal can have a wavelength, for example, of one millimeter or less.

The MEMS switch can be bi-stable, and remain in a switched position until it is subsequently actuated to change to an alternate position. The module can be included within metamaterial having characteristics that can be altered by applying the RF control signal. The characteristics of the metamaterial that can be altered include, for example, at least one of dielectric, reflective, bandgap, and polarization properties of the material. In one particular case, the module is encapsulated and has two accessible switching ports. The module can be encapsulated, for instance, with opaque material. The module can be used to connect antenna elements. The module can be used to connect and disconnect a first reflective element to a second reflective element, thereby enabling wireless change of element length. The module can be included in a printed circuit structure.

The module may further include a transmitter configured to transmit information associated with the module, wherein the transmitter is enabled to transmit when the MEMS switch is actuated from a first position to a transmit enable position. The information associated with the module may include, for example, at least one of location information (e.g., GPS coordinates or shelf and row information), inventory control information (e.g., shelf live and storage date), and module status information (e.g., position 1 or position 2 or MEMS switch active). The module may also include a GPS receiver for providing the location information.

Another embodiment of the present invention provides an RF-actuated microelectromechanical systems (MEMS) switch module. The module includes an antenna for receiving an externally-generated RF control signal, and providing an antenna output signal representative thereof. A circuit is operatively connected to the antenna, and is configured for receiving the antenna output signal and generating a trigger voltage. A MEMS switch is configured to actuate in response to the trigger voltage, so as to connect or disconnect a first reflective element to a second reflective element. Here, the module and the first and second reflective elements form part of a metamaterial (e.g., dielectric foam) having reflective characteristics that can be altered by applying the RF control signal. The metamaterial can be used, for example, to protect temperature sensitive components during a microwave curing operation, by reflecting microwave energy away from the components.

Another embodiment of the present invention provides a selectively changeable radio frequency (RF) element device. The device includes two RF elements having one or more operating frequencies, and an RF-actuated MEMS switch module that is configured to receive an RF control signal different than the one or more operating frequencies, and to selectively connect the two RF elements in response to the RF control signal. The two RF elements can form, for example, part of an antenna element, an antenna segment, an antenna array, a frequency-selective surface (FSS), an artificial dielectric, a metamaterial, and a frequency-selective volume (FSV). In one such particular embodiment, the RF-actuated MEMS switch module can be tuned to actuate in response to a particular RF control signal or signals.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Figure 1:
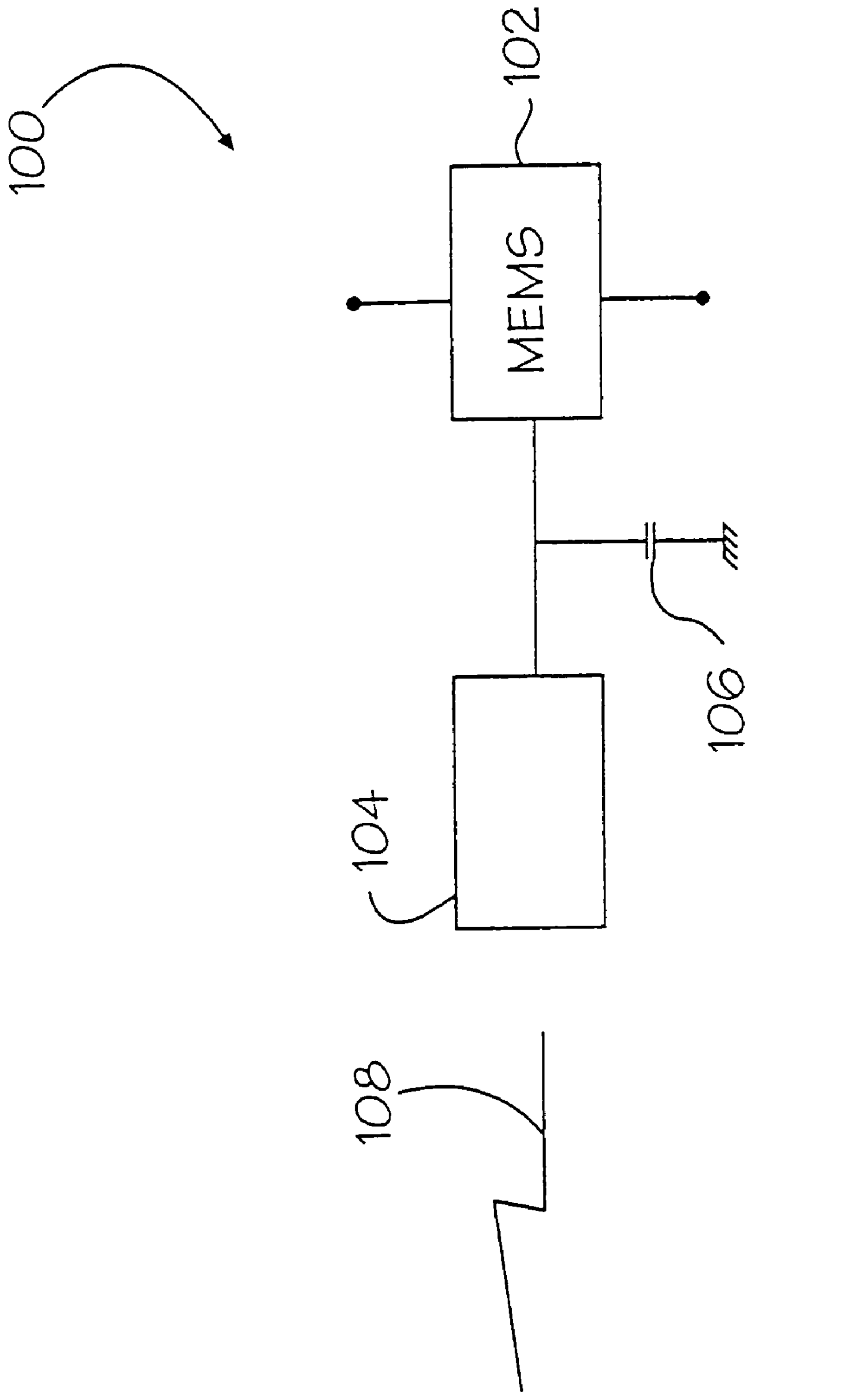
Prior Art Figure 1
FIG. 1 is a schematic block diagram of a conventional light-actuated MEMS switch.

Embodiments of the present invention utilize a beamed radio frequency (RF) control signal to actuate a self-contained, RF-actuated MEMS device.

Overview

Such RF-actuated MEMS devices are useful, for instance, in antenna arrays or other such switchable structures, where delivering control voltages to the MEMS switches photonically or via a physical conductor would be impractical. The frequency of the RF control signal that actuates the MEMS switches is different than the frequency of the RF signals that pass through the MEMS switches. The RF control signal or "actuating energy" for the MEMS switches can be supplied, for example, by switched millimeter or sub-millimeter wavelength RF signals.

As noted, one particular embodiment of the present invention is where RF-actuated MEMS switches are used in switchable RF structures, such as antennas. An actuating RF control signal is received by an antenna of the RF-actuated MEMS switch. Note that this antenna is distinct from the antenna element being switched. The received RF control signal can then be passed to a tuned circuit, which essentially filters out undesired signals. The filtered control signal is then applied to a detector configured to generate a DC control signal that is proportional to the intensity of the RF control signal. The DC control signal derived from the RF control signal is then applied to the control leads of the RF-actuated MEMS switch, thereby changing the state of the switch (e.g., from opened to closed, or vice-versa).

Note that each RF-actuated MEMS switch can be configured (e.g., via a tuned circuit) to actuate in response to RF control signals having a specific frequency. Thus, selective switching applications are enabled, where only specific antenna or similar RF elements of an array are switched, depending on the frequency of the beamed RF control signal. Further note that any one RF-actuated MEMS switches can be configured to actuate in response to more than one RF control signal. In such cases, the tuned circuit of the RF-actuated MEMS switch could be configured to pass multiple frequencies (e.g., 120 GHz, 150 GHz, and 170 GHz, using three distinct tuned circuits). Frequencies allowed to pass through the tuned circuit can be referred to as trigger frequencies. Note that the RF-actuated MEMS switch can include two or more RF-actuated MEMS devices, each adapted to respond to a different trigger frequency.

An RF-actuated MEMS switch as described herein can be packaged, for example, with a suitable miniature antenna, tuned circuit, detector, and optional storage capacitor in a sealed package or otherwise encapsulated. The packaging can be opaque to certain frequencies (e.g., infrared). Likewise, the RF-actuated MEMS switch can be laminated within a multilayer printed circuit structure. The RF-actuated MEMS switches can be used not only for selectively switching antenna elements or segments (active or passive microwave antenna elements), but also for selectively switching FSS elements, scatterers (conductors) within artificial dielectrics, frequency selective volumes (FSVs), and conductive screens. Sufficient isolation between trigger frequencies and non-trigger frequencies permits a dynamic and robust switching scheme appropriate for many applications.

RF-Actuated MEMS Architecture

Figure 2:
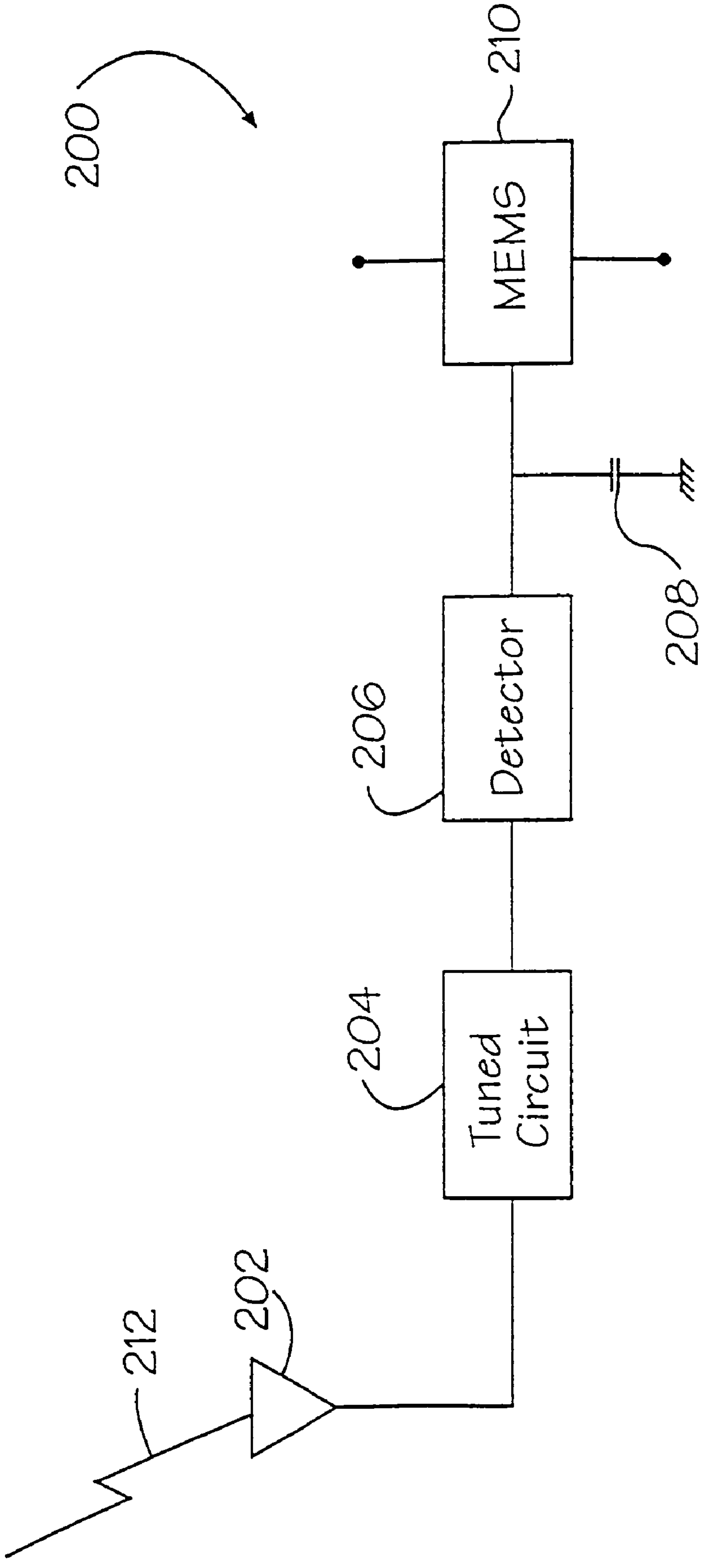
FIG. 2 is a schematic block diagram of an RF-actuated MEMS switch configured in accordance with one embodiment of the present invention.

FIG. 2 is a schematic block diagram of an RF-actuated MEMS configured in accordance with one embodiment of the present invention. As can be seen, the assembly 200 includes an antenna 202, a tuned circuit 204, a detector 206, a capacitor 208, and a MEMS switch 210. These components can be populated, for example, on a substrate configured with interconnecting conductor runs to effect the interconnections between the components.

Here, an actuating RF control signal 212 is received by the antenna 202 (which is distinct from the antenna element being switched) of the RF-actuated MEMS switch. The received RF control signal is then passed to the tuned circuit 204, which essentially filters out undesired signals, and passes only signals having a desired frequency. The filtered control signal is then applied to the detector 206, which is configured to generate a DC control signal that is proportional to the intensity of the RF control signal. The DC control signal output by the detector 206 charges optional capacitor 208, and is applied to the control leads of the MEMS switch 210, thereby changing the state of the switch 210 (e.g., from opened to closed, or vice-versa).

The tuned circuit 204 and detector 206 are configured to generate the desired DC control signal to operate the MEMS switch 210, and can be implemented with conventional technology. In one particular embodiment, the tuned circuit 204 includes an LC tank circuit tuned to resonate at a specific millimeter/sub-millimeter wavelength, where the resonant frequency equals $1/[2\pi(LC)^{1/2}]$. The continuous wave signal output by the tuned circuit 204 is then passed to the detector 206. The detector 206 can be implemented, for example, with a conventional rectifier circuit. The power of the rectified continuous wave output by the tuned circuit 204 and the detector 206 can then be used to charge the capacitor 208, thereby actuating the MEMS switch 210. The transmit power of the RF control signal 212 depends upon the distance to the antenna 202 and the configuration of the circuitry in assembly 200 (e.g., whether voltage doublers or other means to augment the control signals are employed).

Various configurations of conventional or custom tuned circuit 204 and detector 206 can be used here, as will be apparent in light of this disclosure. Note that the tuned circuit 204 and detector 206 can be implemented as a single module, as opposed to two separate modules. Further note that other functionality, such as amplification and filtering, can also be added as desired.

The use of RF energy to actuate the MEMS switch 210 eliminates the need for an optic fiber and the deliverance of laser light or the like. This means that the assembly 200 may be located anywhere that the RF control signal 212 can be received by antenna 202 to switch the MEMS switch 210. The on-board processing (e.g., filtering, rectification, conversion to DC, and amplification) of the received RF control signal can be performed as desired. The MEMS switch 210 requires very little current and hence power to switch. A pulsed RF continuous wave control signal is sufficient to actuate the MEMS switch, whereby the length of the pulse is that which is needed to provide the switching power. In one example case, the control signal is in the range of 90 GHz to 100 GHz (e.g., provided by a W-band transmitter), has a transmit power of about 1 watt (assume a travel distance of 1000 feet or less), and is pulsed for about 10 to 100 microseconds. Many standard MEMS switches or bi-stable switches can be used.

Note that bi-stable MEMS switches remain in a switched position until they are actuated to change. Thus, a first application of an RF control signal or "trigger frequency" will cause a bi-stable MEMS switch to switch from its current position (position 1) to its other position (position 2) and remain there until the trigger frequency is applied again. When a second application of that trigger frequency is applied, the bi-stable MEMS switch will switch from position 2 back to position 1.

Figure 3:
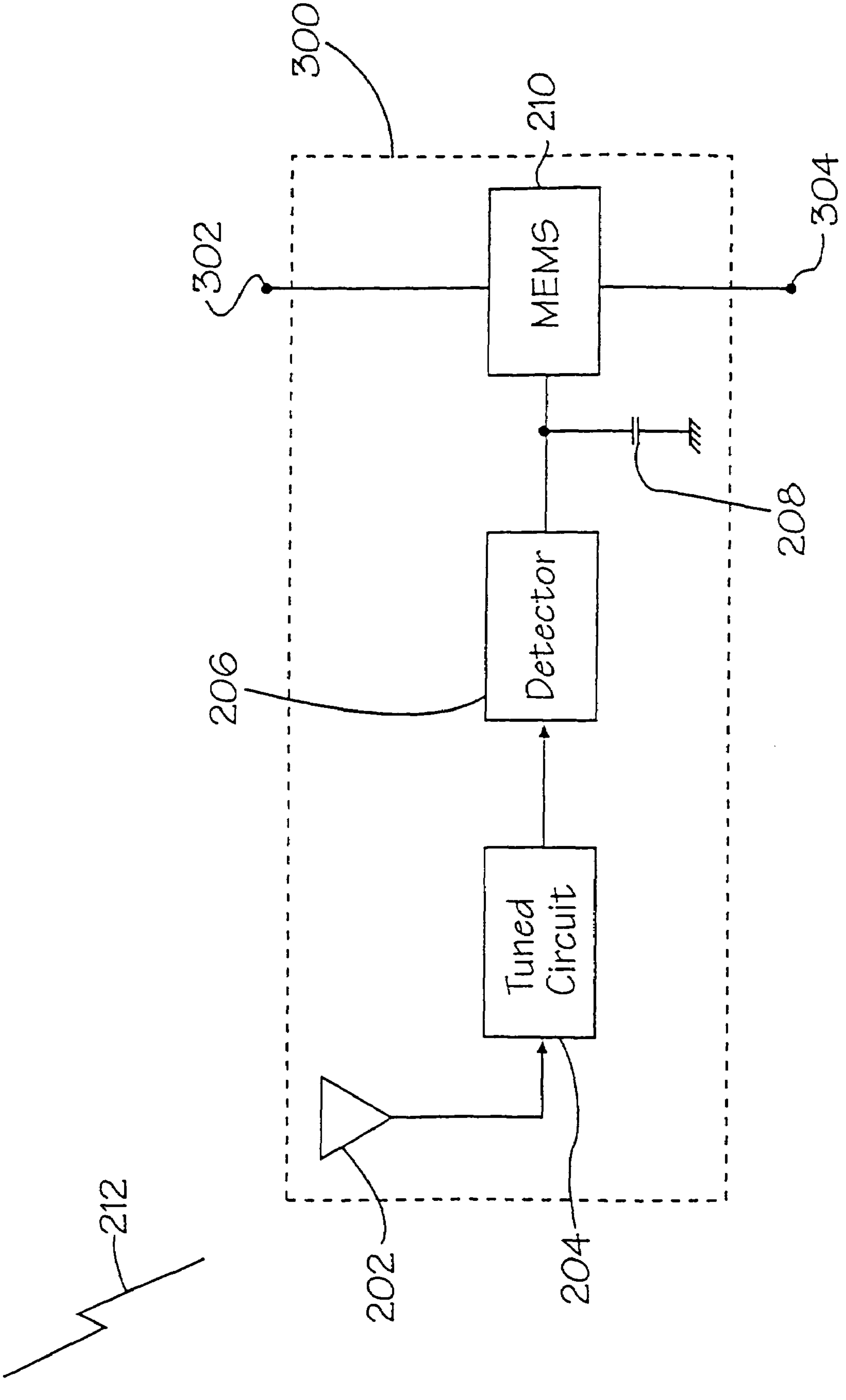
FIG. 3 is a schematic block diagram of an encapsulated RF-actuated MEMS switch configured in accordance with one embodiment of the present invention.

FIG. 3 is a schematic block diagram of an encapsulated RF-actuated MEMS configured in accordance with one embodiment of the present invention. Here, the RF-actuated MEMS assembly 200 of FIG. 2 is shown as an encapsulated assembly 300. Note that the encapsulation material can be opaque to light (e.g., IR or laser light). This is possible because there is no longer any requirement for an optical input as there would be with a conventional MEMS switch.

A pair of switched terminals 302, 304 is available outside of MEMS switch assembly 300. In one example embodiment, terminal 302 can be coupled to an element of an antenna structure and terminal 304 can be coupled to the antenna structure ground plane. Thus, the assembly 300 could be used to switch that element in and out of the antenna structure circuit. Likewise, terminal 302 can be coupled to an element of an reflecting structure and terminal 304 can be coupled to another element. Here, the assembly 300 could be used to change the length of the element, thereby changing the frequencies reflected by the structure.

Antenna Array

Figure 4:
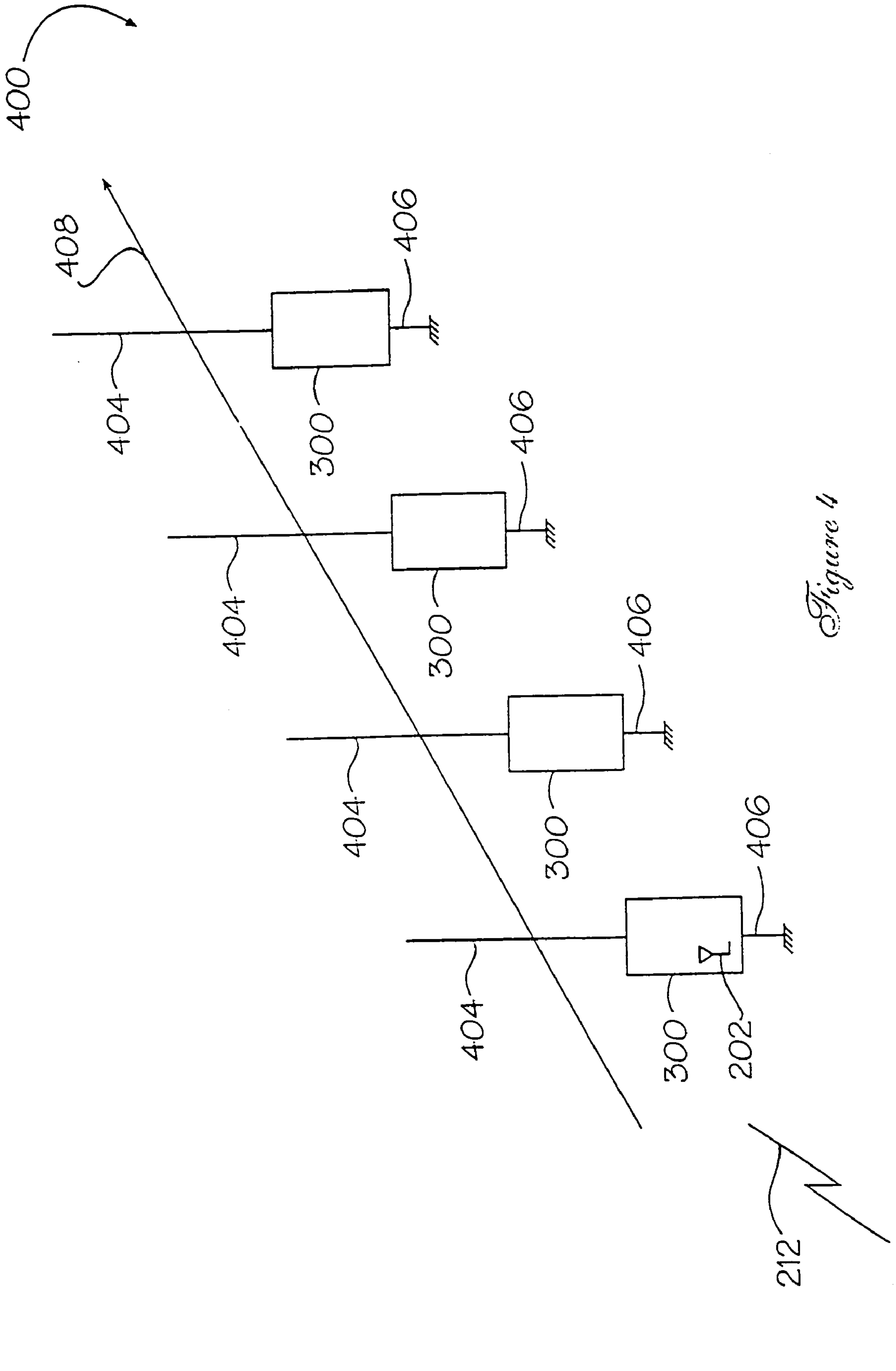
FIG. 4 is a schematic perspective view of an antenna array system configured with a MEMS switch-selectable ground plane, in accordance with one embodiment of the present invention.
Figure 5:
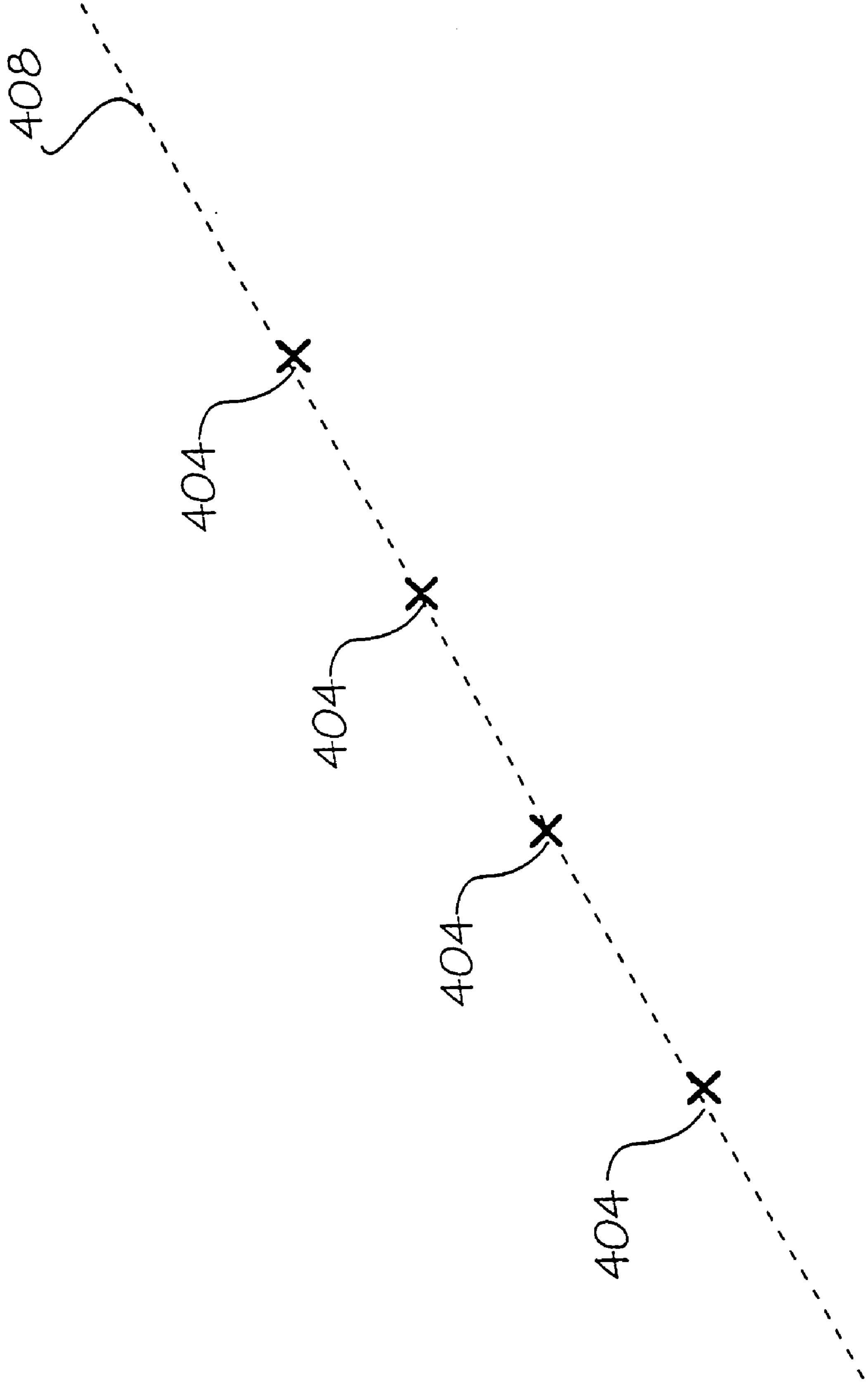
FIG. 5 is a schematic top view of the array system shown in FIG. 4.

FIG. 4 is a schematic perspective view of an antenna array system 400 configured with a MEMS switch-selectable ground plane, in accordance with one embodiment of the present invention. FIG. 5 is a schematic top view of the array system 400. The antenna array system 400 can be used to transmit or receive information, or both. In any case, the antenna can be reconfigured in real-time to, for example, receive a particular wavelength or to transmit in a particular direction.

The system 400 includes four reflective elements 404 aligned in a plane 408, although any number of elements can be deployed as shown. Each element 404 can be connected to ground 406 via an RF-actuated MEMS switch assembly 300. The RF-actuated MEMS switch assemblies 300 can be configured as discussed in reference to FIG. 2 (not encapsulated) or FIG. 3 (encapsulated). Note, however, that encapsulating the system 400 in an opaque or absorbing material may help in controlling reflections back to the transmitting source (backscatter and retroreflections), which are generally undesirable in stealth applications.

MEMS switch assemblies 300 are actuated by RF control signal 212 received at antenna 202 within each MEMS switch assembly 300. When MEMS switch assembly 300 is actuated, antenna elements 404 are electrically connected to ground 406, thereby forming a ground plane coincident with plane 408. In this way, the system 400 can be configured in real-time to have its frequency and/or their directional characteristics altered so as to perform in one or more frequency bands and/or with one or more directionability patterns.

Note that an RF-actuated MEMS switch assembly 300 can also be used to connect one element 404 to another element 404 (as opposed to ground). Here, activating the RF-actuated MEMS switch assembly 300 would effectively change the length of the element, and therefore its resonant frequency. Various configurations will be apparent in light of this disclosure, and the present invention is not intended to be limited to any one such configuration.

Figure 6:
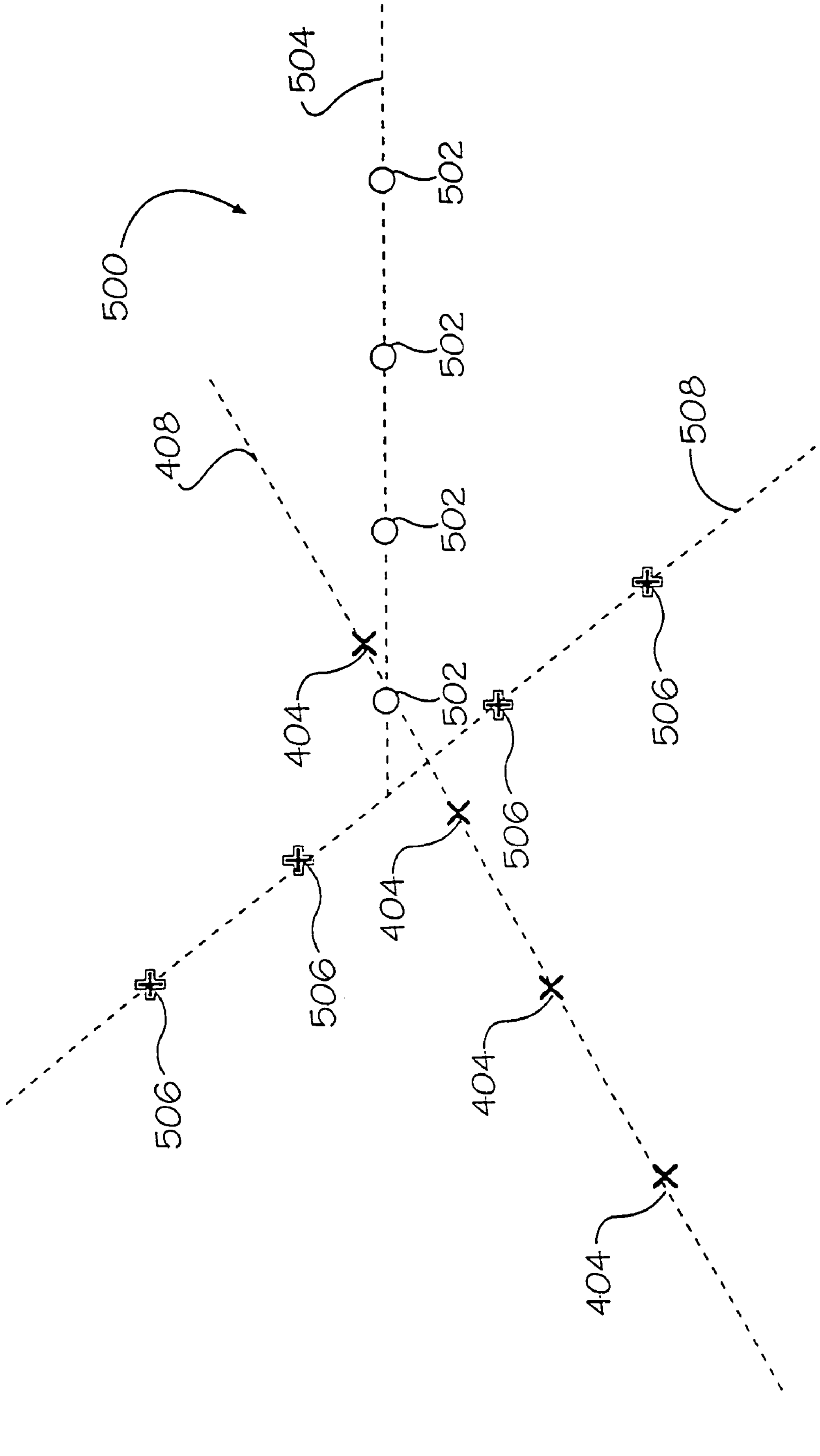
FIG. 6 is a top view showing multiple MEMS switch-selectable antenna arrays, in accordance with another embodiment of the present invention.

FIG. 6 is a top view showing multiple MEMS switch-selectable antenna arrays, in accordance with another embodiment of the present invention. Here, system 500 includes three sets of reflective elements. Reflective elements 404 are shown in plane 408. In addition, two additional sets of reflective elements 502 and 506 are deployed in planes 504 and 508, respectively.

Assume that each of the reflective elements in any one set can be switched to ground via RF-actuated MEMS switches as discussed in reference to FIGS. 4 and 5. Further assume that the RF-actuated MEMS switches associated with reflective elements 404 are configured to actuate in response to a first RF control signal (e.g., 90 GHz), and that the RF-actuated MEMS switches associated with reflective elements 502 are configured to actuate in response to a second RF control signal (e.g., 92 GHz), and that the RF-actuated MEMS switches associated with reflective elements 506 are configured to actuate in response to a third RF control signal (e.g., 94 GHz). Thus, the arrays in planes 408, 504 and 508 can be independently switched, thereby altering the directional characteristics of the system 500.

Figure 7:
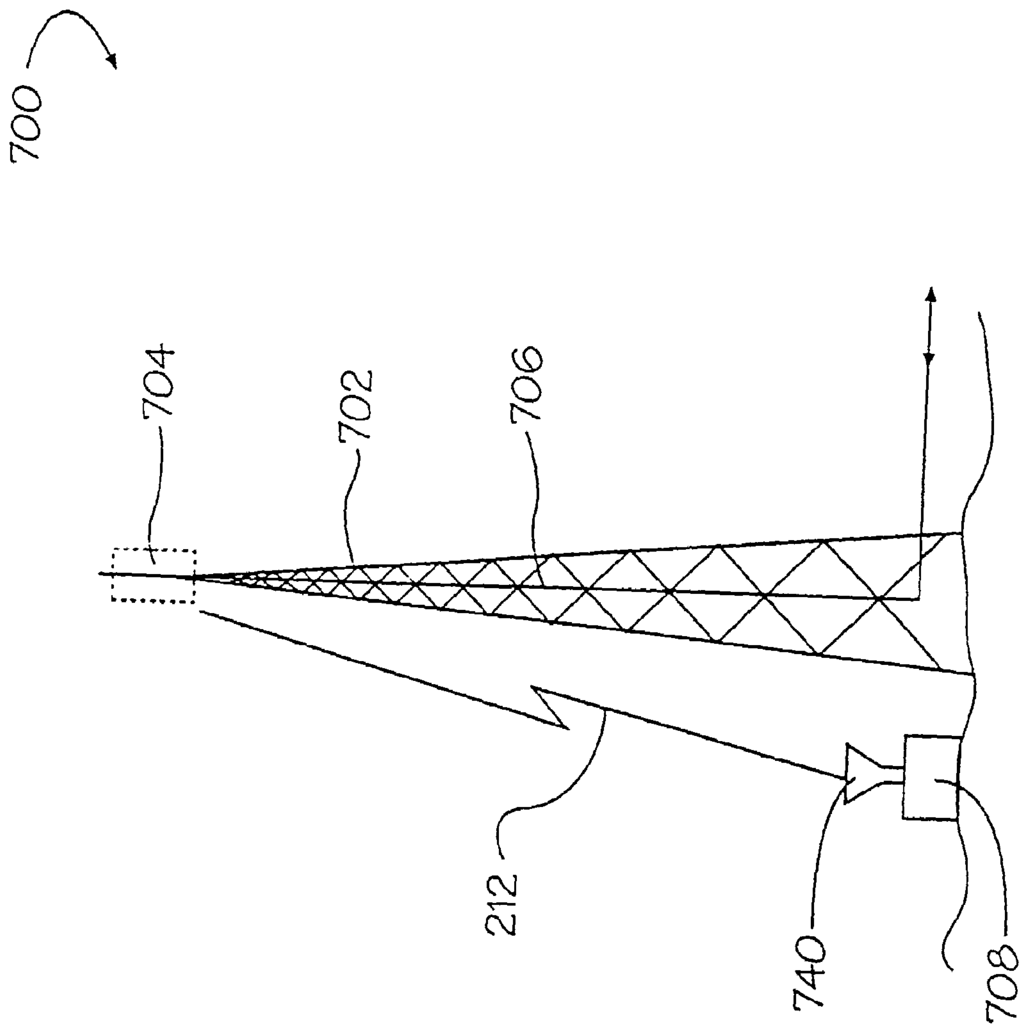
FIG. 7 is a schematic view of a tower installation configured with a MEMS switch-selectable antenna array, in accordance with another embodiment of the present invention.

FIG. 7 is a schematic view of a tower installation 700 configured with a MEMS switch-selectable antenna array, in accordance with another embodiment of the present invention.

Here, a tower structure 702 has an antenna array 704 disposed on the top thereof to provide omni-directional or sectorized coverage. One or more feedlines 706 are used to connect antenna array 704 to a receiver/transmitter (not shown). Antenna array 704 can include one or more RF-actuated MEMS switches 300 as discussed in reference to FIGS. 3, 4, 5, and 6.

These RF-actuated MEMS switches 300 are actuated by an RF control signal 212 generated at an RF signal source 708, which transmits signal 212 through a horn antenna 740. A wide variety of RF sources and/or antenna structures could be utilized to provide the RF control signal 212 to the RF-actuated MEMS switches 300 included in the antenna array 704.

Real-Time Wireless Configuration of Metamaterials

While FIG. 7 demonstrates one example of how RF-actuated MEMS switches could be employed, it will be appreciated that many other antenna and reflective structure topologies may be constructed using the RF-actuated MEMS switches to switch either active or passive elements.

For example, consider a bulk or layered material, such as a sheet or block or metamaterials that include a number of switchable reflective elements. Some of the elements within the material can be coupled to one another via RF-actuated MEMS switches, and/or some elements can be coupled to ground or another potential via RF-actuated MEMS switches. Numerous element switching schemes can be used to effect various known antenna and reflector configurations, as will be apparent in light of this disclosure. In any such configurations, the characteristics (e.g., dielectric, reflective, bandgap, or polarization properties) of the material can be altered by applying an RF control signal (or RF control signals) to actuate one or more of the RF-actuated MEMS switches within the material.

Figure 8:
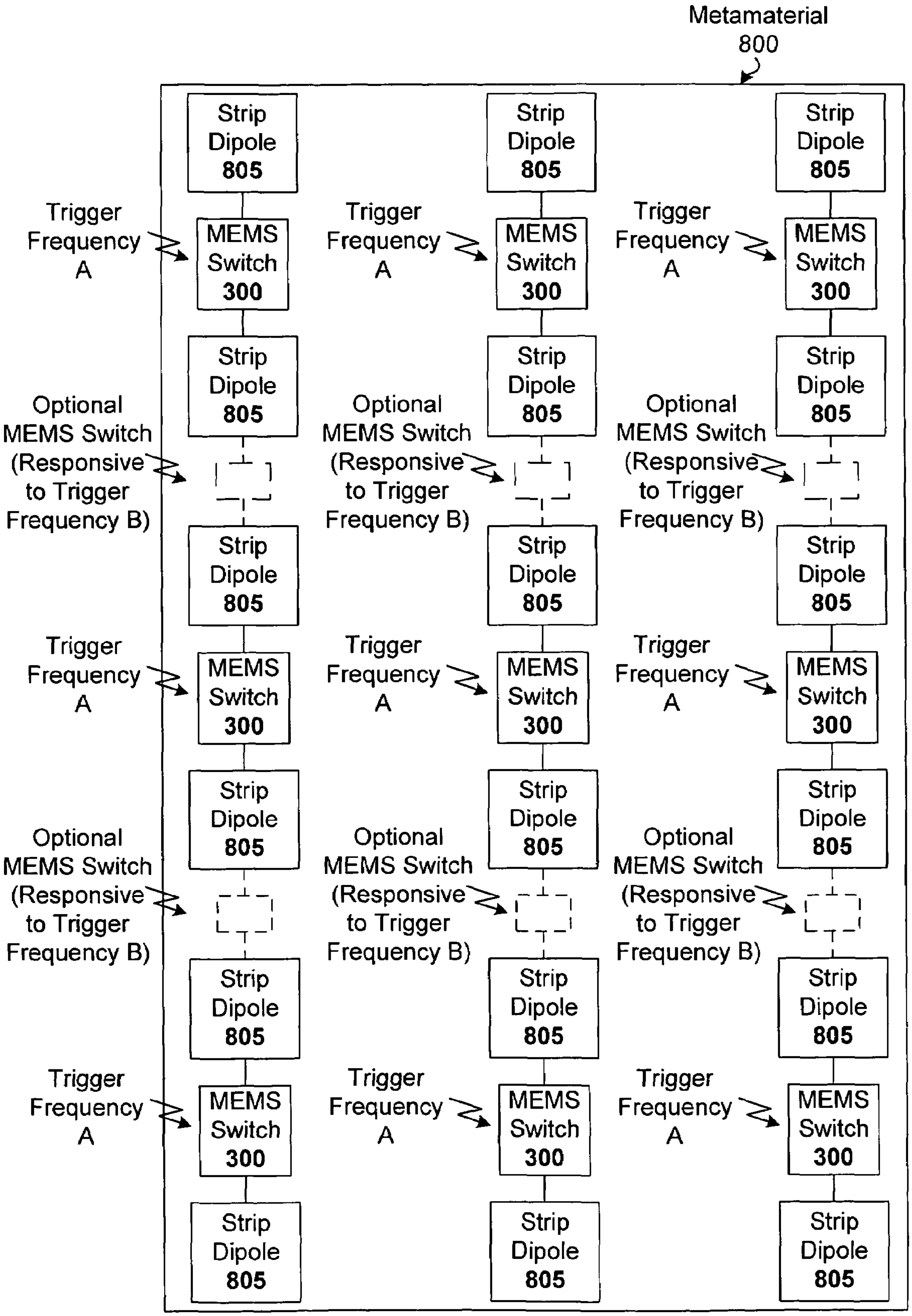
FIG. 8 is a block diagram view of a bulk material configured with RF-actuated MEMS switches, in accordance with another embodiment of the present invention.

FIG. 8 illustrates an example block of artificial dielectric material (metamaterial 800) configured with a periodic array of metal pieces (dipole strips 805) interconnected by MEMS switches 300 embedded in some foam or other dielectric material. Only one plane of the block is shown, but multiple planes may be included thereby giving the block or sheet a desired thickness, as well as width and height. Note that each plane can have any number of switched dipole strips 805.

In this example, the length of the vertically polarized dipole strips 805 can be changed by turning MEMS switches 300 on or off. In particular, the length of the dipole strips can be doubled by pulsing the metamaterial 800 with trigger frequency A. Also, with the optional MEMS switches shown, the length of the dipole strips can be further changed in response to trigger frequency B, which causes all the dipole strips 805 associated with one column in the metamaterial 800 to be connected (assuming trigger frequency A has already been applied).

Changing the length of the dipole strips 805 effectively changes the frequency that is reflected by the metamaterial 800. As a general rule of thumb, total reflectance can be achieved where the length of dipole strips 805 is about one half of (or longer) than the wavelength to be reflected.

Thus, while some lower frequencies can pass through the metamaterial without being reflected, other higher frequencies will be reflected, depending on the length of the dipole strips 805. Further note that, depending on the configuration of the metamaterial, numerous frequencies can be reflected. For instance, in the example shown, the highest frequency that can be reflected would be that reflected by a single strip dipole 805 (when all MEMS switches are open). The second highest frequency that can be reflected would be that reflected by two strip dipoles 805 connected together by a MEMS switch 300. The third highest frequency that can be reflected would be that reflected by all six strip dipoles 805 connected together by MEMS switches 300 and optional MEMS switches associated with one column of the metamaterial.

Various applications for such a real-time wirelessly configurable metamaterial will be apparent. For instance, assume the metamaterial 800 is used to cover an airplane. The plane will generally want to transmit information at a particular frequency (e.g., 5 GHz or less). The metamaterial 800 will be configured to allow this “friendly frequency” to pass. However, other higher frequencies, such as those associated with tracking radars, may also be present in the air space of the plane. The metamaterial 800 will be configured to reflect this “unfriendly frequency” thereby preventing that frequency from reaching the structure of the plane. Thus, less information can be learned about the aircraft. In addition, note that the metamaterial 800 can be real-time configured to reflect multiple types of unfriendly frequency. Other embodiments and configurations will be apparent in light of this disclosure.

For instance, consider a curing operation where an assembled circuit is placed in a microwave oven for curing of epoxy or other such bonding material thereon used to hold components in place. Further, assume that not all components included in the circuit can withstand the curing temperature provided by the microwave energy necessary for curing. In such a case, the components not rated for temperature caused by the microwave energy can be coated or otherwise selectively covered with metamaterial configured to reflect the microwave energy, thereby protecting those components from excessive heat during the curing process.

In another antenna application, there are instances in cellular communications, especially near a busy highway, where there is a need to have more channel capacity in one direction, while simultaneously providing omni-directional coverage around the cell tower. This may be achieved by sectorizing coverage and, if there is enough isolation between the sectors, the same frequency channels may be reused. By triggering the appropriate RF-actuated MEMS switches to form the required corner reflectors or ground planes, the sector coverage may be adjusted to fit the current need. The characteristics of a cell tower could be altered by changing the characteristics of bulk material forming the antenna behind a central feed. During part of the day, the antenna can direct beams in a certain direction, and then be switched to a different direction by illuminating the bulk material with the appropriate RF control signal, thereby triggering a desired change in the arrangement of the antenna elements.

Another example application relates to inventory control and reconfigurable tagging units. In conventional systems, a deactivation unit is used to burn a diode in the coil of a tag unit, thereby deactivating that tag unit. Using RF-actuated MEMS switches in accordance with an embodiment of the present invention, tags could be tuned to a particular trigger frequency and set to mark specific items. Groups of tag units could be activated and deactivated using the assigned trigger frequencies. Also, the MEMS switches of FIG. 2 or 3 can be further configured with a transmitter that transmits location and other useful information when the MEMS switch is activated by its trigger frequency. This configuration would be particularly useful in large warehouse operations, where inventories are spread out over large areas and can be lost or otherwise misplaced. The transmitter could be combined with a GPS receiver, thereby allowing GPS coordinates to be transmitted by to the requesting party.

Figure 9:
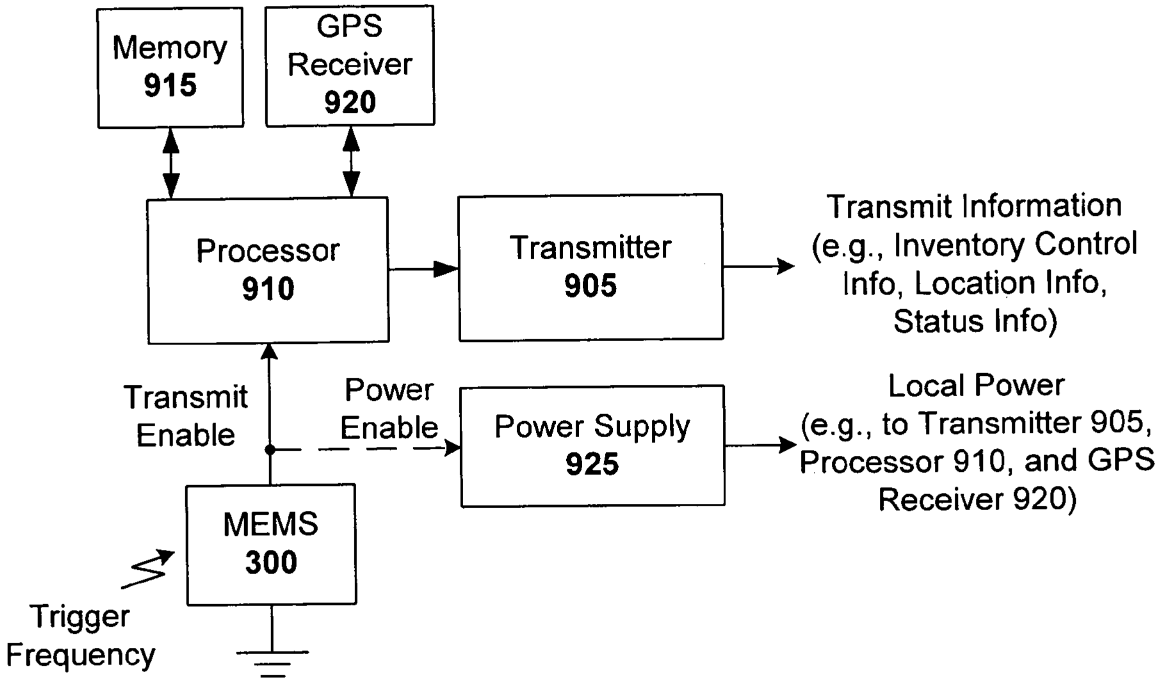
FIG. 9 is a block diagram of an RF-actuated MEMS switch configured with processing and transmitting capability, in accordance with another embodiment of the present invention.

One such an embodiment is shown in FIG. 9. Here, MEMS switch 300 switches in a ground (in response to the trigger frequency), thereby providing a transmit enable signal to processor 910. The processor 910 is operatively coupled to a memory 915, a GPS receiver 920, and a transmitter 905, which can all be implemented with conventional technology. A power supply 925 provides necessary power to, for example, the transmitter 905, processor 910, and the GPS receiver 920, and can be a battery or other suitable power source. The memory 915 can store useful information relevant to the particular application, such as inventory control information (e.g., stock, price per unit, total number of units in inventory, location in the warehouse, shelf life and initial storage date, and status information, such as purchased or not purchased). Instructions that can be executed by the processor 910 can also be stored in memory 915. The GPS receiver 920 could be used in an application where movement of the tagging unit must be tracked (e.g., personnel, vehicle, or package monitoring). In any case, when the trigger frequency is received by the MEMS switch 300, the processor 910 receives the transmit enable signal and provides the information to be transmitted to the transmitter 905 for transmission. The transmit information can then be received by the requesting party. The processor can be a microcontroller unit or other suitable programmable environment (e.g., ASIC, FPGA). Other configurations are possible here, such using a transceiver capable of both transmitting and receiving information (instead of transmitter 905). This would allow instructions to be downloaded to memory 915 and real-time configuration of processor 910.

Some tagging units may have to transmit much information (a full complement of inventory control information, such as dates of manufacture, location/GPS coordinates, etc). Some packages might have to be on shelves for long periods of time ranging from several months to years. In such cases, it would be desirable to conserve battery power while waiting for a trigger signal. Hence, the wireless MEMS switch could also be used to provide an "enable power" signal to the local power supply 925 of the tag unit, thereby coupling power to the transmitter 905 (and any other power using module) long enough to relay the needed information. A timer circuit (e.g., one shot timer) could be used to apply power for a set period of time in response to the enable power signal. Numerous power conservations schemes can be used here.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. An RF-actuated microelectromechanical systems (MEMS) switch module, comprising: an antenna for receiving an externally-generated RF MEMS switch control signal, and providing an antenna output signal representative thereof; a circuit operatively connected to the antenna for receiving the antenna output signal and generating a trigger voltage; a MEMS switch configured to actuate in response to the trigger voltage; and wherein said module is formed as a metamaterial having characteristics that can be altered by applying said RF MEMS switch control signal.

2. The module of claim 1 wherein the circuit comprises:

a tuned circuit operatively connected to the antenna and configured to resonate at the frequency of the RF MEMS switch control signal, thereby providing a continuous wave signal; and a detector operatively connected to the tuned circuit and configured to generate the trigger voltage based on the continuous wave signal.

3. The module of claim 1 wherein the detector includes a rectifier and capacitor circuit.

4. The module of claim 1 wherein the MEMS switch is bi-stable, and remains in a switched position until it is subsequently actuated to change to an alternate position.

5. The module of claim 1 wherein the characteristics of the metamaterial that can be altered include at least one of dielectric, reflective, bandgap, and polarization properties of the metamaterial.

6. The module of claim 1 wherein the module is encapsulated and has two accessible switching ports.

7. The module of claim 1 wherein the module is encapsulated with opaque material.

8. The module of claim 1 wherein the module is used to connect antenna elements.

9. The module of claim 1 wherein the module is used to connect and disconnect a first reflective element to a second reflective element, thereby enabling wireless change of element length.

10. The module of claim 1 wherein the module is included in a printed circuit structure.

11. The module of claim 1 wherein the RF MEMS switch control signal has a wavelength of one millimeter or less.

12. The module of claim 1 farther comprising:

a transmitter configured to transmit information associated with the module, wherein the transmitter is enabled to transmit when the MEMS switch is actuated from a first position to a transmit enable position.

13. The module of claim 12 further wherein the information associated with the module includes at least one of location information, inventory control information, and module status information.

14. The module of claim 12 further comprising:

a GPS receiver for providing the location information.

15. An RF-actuated microelectromechanical systems (MEMS) switch module, comprising:

an antenna for receiving an externally-generated RF MEMS switch control signal, and providing an antenna output signal representative thereof;

a circuit operatively connected to the antenna for receiving the antenna output signal and generating a trigger voltage; and a MEMS switch configured to actuate in response to the trigger voltage, so as to connect or disconnect a first reflective element to a second reflective element;

wherein the module and the first and second reflective elements form part of a metamaterial having reflective characteristics that can be altered by applying the RF MEMS switch control signal.

16. The module of claim 15 wherein the metamaterial is used to protect temperature sensitive components during a microwave curing operation, by reflecting microwave energy away from the components.

17. A selectively changeable radio frequency (RF) element device, comprising:

at least two RF elements having one or more operating frequencies; and an RF-actuated MEMS switch module having at least one MEMS switch configured to receive an RF MEMS switch control signal different than the one or more operating frequencies, and to selectively connect the two RF elements by said MEMS switch in response to the RF MEMS switch control signal; and wherein the RF element device is a metamaterial.

18. The device of claim 17 wherein the at least two RF elements form part of an antenna element, an antenna segment, an antenna array, a frequency-selective surface (FSS), and a frequency-selective volume (FSV).

19. The device of claim 17 wherein the RF-actuated MEMS switch module can be tuned to actuate in response to a particular RF MEMS switch control signal or signals.

* * * * *